Figure 1:
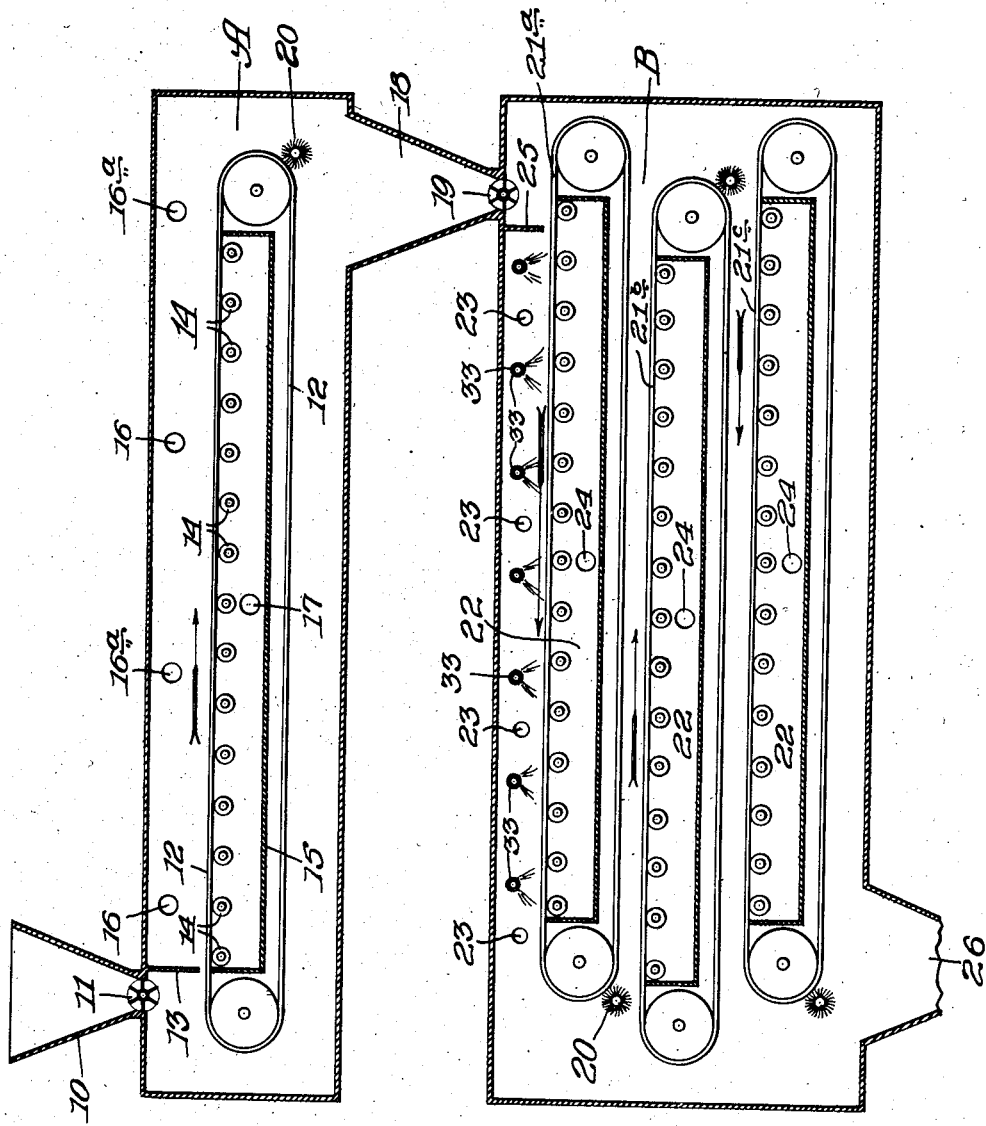

April 7, 1936. S. S. SVENDSEN 2,036,508
MANUFACTURE OF GRANULAR ALUMINUM HYDROXIDE
Filed Aug. 28, 1931 2 Sheets-Sheet 1

Inventor:
Svend S. Svendsen,

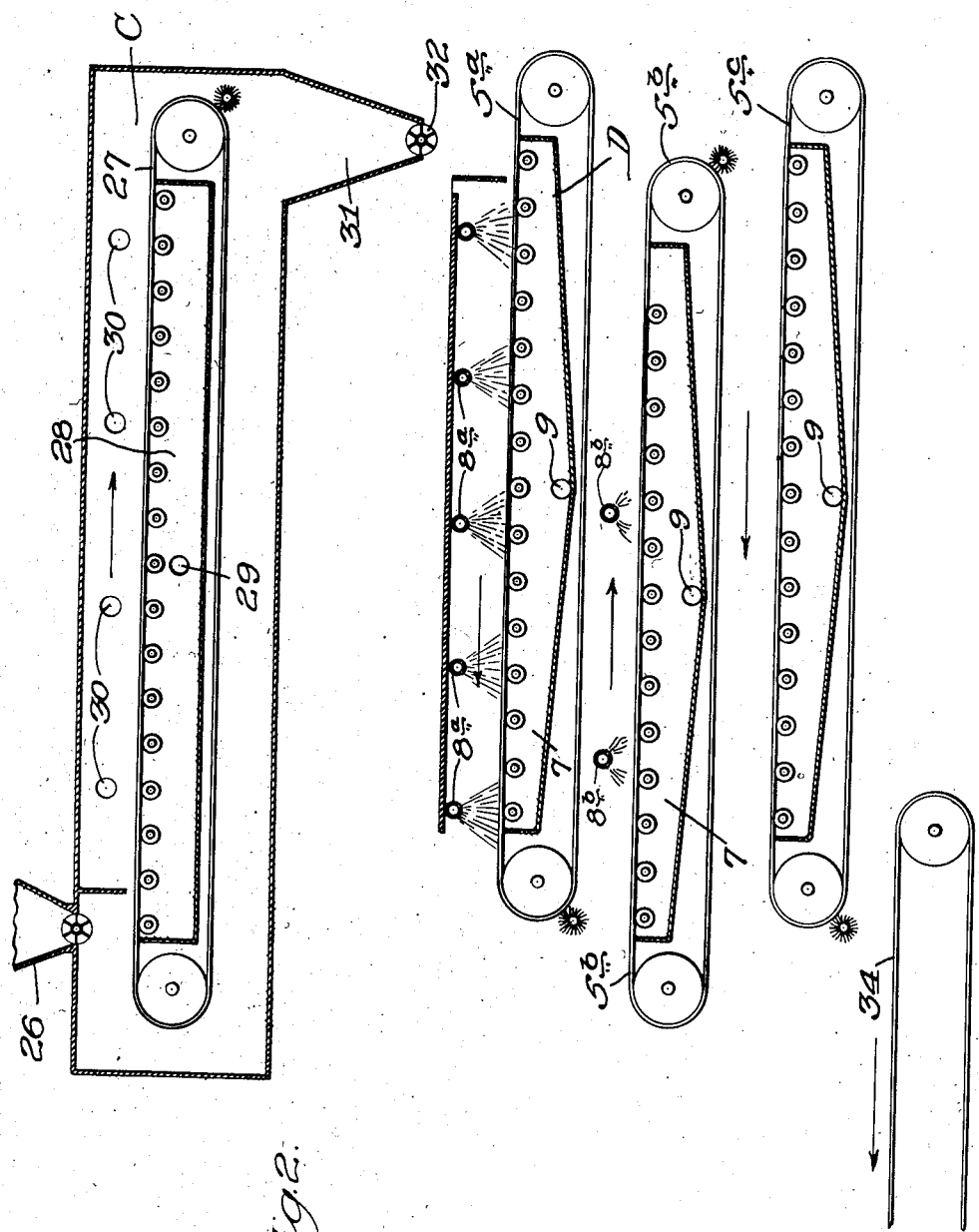

Patented Apr. 7, 1936

2,036,508

UNITED STATES PATENT OFFICE 2,036,508

MANUFACTURE OF GRANULAR ALUMINUM HYDROXIDE

Svend S. Svendsen, Madison, Wis., assignor to Clay Reduction Company, Chicago, Ill., a corporation of Illinois Application August 28, 1931, Serial No. 560,035

15 Claims. (Cl. 23—141)

The present invention relates to the manufacture of a granular aluminum hydroxide from an aluminum sulfate compound, such as aluminum sulfate or the alums, the ammonium and potassium alums being particularly suitable for the purpose.

In accordance with the present invention, an aluminum sulfate compound is treated with ammonia gas under controlled conditions as hereinafter set forth, forming ammonium sulfate and granular aluminum hydroxide.

My invention will be readily understood from the following description, together with the accompanying drawings showing apparatus suitable for converting aluminum sulfate compounds into granular aluminum hydroxide in the practice of my method, in which—

Figure 1 is a diagrammatic view in elevation of an ammonia tail gas remover and an ammonia gas reactor; and Fig. 2 is a diagrammatic view in elevation of an excess ammonia remover and a traveling washing filter. The former is connected with the reactor shown in Fig. 1, but in the drawings is shown broken off therefrom for convenience in illustration.

The aluminum sulfate salt employed in the process may be produced in any suitable manner; for example, as described in my prior application, Serial No. 425,345, filed February 1, 1930, (which has become Patent 1,911,004, granted May 23, 1933) by the treatment of a suitable silicious material with an ammonium fluoride under conditions to produce and volatilize silicon diamino tetrafluoride, and by subjecting the residue to the action of a reactive sulfate in the presence of ammonia or of ammonium bisulfate, whereby anhydrous ammonium alum is formed.

The anhydrous aluminum sulfate compound thus formed or other crude alum or aluminum sulfate employed is freed from impurities and crystallized in any suitable manner; for example, I may convert it into a pure crystalline salt, as follows:

The sulfate residue from the furnace treatment or other crude product employed is lixiviated with sufficient water to dissolve the anhydrous alum, the water being heated. Preferably, the temperature is kept at about 100° C. during the operation. The alum is then crystallized out by cooling, the formation of large crystals being prevented, for example, by stirring. The crystals are then filtered and washed on traveling filter belts, for instance of metal cloth traveling over suction boxes.

A suitable filtering and washing apparatus is shown in Fig. 2 of the accompanying drawings, and lettered D.

Referring to Fig. 2 of the drawings, 5a, 5b and 5c, indicate travelling filter belts of suitable fabric, metal cloth or the like, supported by rollers 6 and traveling over suction boxes 7 in the direction indicated by the arrows. The crystals, suitably fed to the upper belt 5a, are washed with water during the travel of the belt, introduced through the spray pipes 8a and 8b, and discharged on to belt 5b and then 5c, on which they are further treated and discharged on to the conveyor belt 34. The wash water and filtrate are drawn through the belts and removed from the suction boxes through suction pipes 9, and may be employed in the lixiviation of the anhydrous alum.

The crystals may then be further purified; for example, they may be redissolved in a small amount of hot water, preferably at about 100° C. The small amount of solid impurities present may be removed by filtering the hot solution through a pressure filter (not shown), preferably steam jacketed, and the alum recrystallized from the filtrate by cooling. As above described, the formation of large crystals is prevented. The crystals may be filtered and washed and are then ready to be converted into the hydroxide. The crystallization of the alum as fine crystals prevents the occlusion of mother liquor carrying iron in the crystals and facilitates the conversion of the crystals into aluminum hydroxide. The crystals should preferably be of a size to pass through a twenty mesh screen, although somewhat larger crystals may be employed.

The mother liquor from the last crystallization and the wash water from washing the final crystals, may be used in the washing and solution of the first-formed crystals, while the filtrate and wash water from the first crystallization may be used in the lixiviation of the anhydrous alum. By preliminarily crystallizing and washing the alum before filtering the hot solution, solid impurities of extreme fineness are eliminated. These impurities are easily separated from the mother liquor and dilute wash liquors from the alum crystals, while in the hot concentrated alum solution they cause very serious filtering problems.

It is preferred that the alum solution be kept in contact with metallic aluminum, particularly during the solution of the alum, since any iron present or dissolved with the alum is thereby kept substantially entirely in the ferrous state and remains in the mother liquor during crystallization of the alum. The reactions for the production of the anhydrous sulfate are preferably conducted in such a manner that substantially all of the iron content of the raw material will remain undissolved during the lixiviation, but a small amount of iron may go into solution. To prevent accumulation of iron in the mother liquor, it may be removed therefrom as a prussian blue lake. This removal is conveniently done in the filtrate from the first crystallization before its return to the lixiviator, for example, by suspending a suitable adsorbent, such as precipitated silica in the solution and precipitating the prussian blue on the silica by the addition of a ferro-cyanide, such as ammonium ferro-cyanide in a suitable quantity. By thus precipitating the prussian blue as a lake an easily filterable precipitate is formed instead of the colloidal prussian blue precipitate formed by using the ferro-cyanide alone.

The silica employed is preferably one which has high adsorbent properties and is somewhat transparent, in order to produce a high grade lake pigment. For example, I may employ the alpha-silica obtained by the decomposition of silicon diamino tetrafluoride, for example, as described in my prior application, Serial No. 543,027, filed June 8, 1931 (which has become Patent 1,959,748, granted May 22, 1934); or I may employ the beta silica product described in my prior application 547,781, filed June 29, 1931 (which has become Patent 1,959,749, granted May 22, 1934).

In accordance with the present invention the conversion of the crystallized aluminum sulfate compounds into granular aluminum hydroxide is effected by the action of ammonia gas, for instance, ammonia evolved in the furnace in the production of the anhydrous alum, and the operation is conducted in such a manner as to prevent the crystals from melting by the heat of reaction or from being dissolved in the water of crystallization liberated in the reaction.

The following equation illustrates the reaction when ammonia alum is selected as the aluminum sulfate salt:

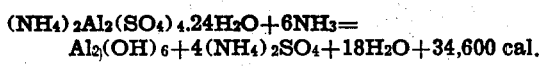

$$(NH_4)_2Al_2(SO_4)_4.24H_2O + 6NH_3 = Al_2(OH)_6 + 4(NH_4)_2SO_4 + 18H_2O + 34,600 \text{ cal.}$$

This heat of reaction is sufficient to dissolve the crystals in the liberated water of crystallization if permitted to remain present.

When concentrated aqua ammonia reacts upon crystals of an aluminum sulfate salt, a dense precipitate is formed, which, after washing and drying, consists of a finely divided powder. A similar precipitate is formed on treating a concentrated alum solution with ammonia gas or on treating crystals of the aluminum sulphate salt with ammonia gas in the presence of the water of crystallization liberated in the reaction.

If, however, the operation is conducted in accordance with my invention a solid granular, sand-like precipitate is formed which retains the crystalline form of the aluminum salt. The resulting hydrate is a pseudomorph of the alum crystals used. The precipitate washes and filters very easily and behaves on the filter like sand. The reaction is almost instantaneous with fine crystalline material, requiring somewhat more time with larger crystals. This rapidity of reaction is a distinct advantage commercially, for obvious reasons. It is apparent that if dissolution of the salt crystals is forestalled by immediately removing the water liberated in the reaction, that the ammonia gas will be in contact with solid crystals throughout the reaction.

In carrying out the invention, dissolution of the crystals during the reaction may be prevented by removing heat generated in the reaction, for example, by maintaining a reduced temperature in the reaction at which the solubility of the aluminum sulfate compound is very low or negligible, for example below 20° C. and preferably about 0° C. At that temperature the solubility of the aluminum sulfate compound, for example, ammonia alum in the saturated solution formed is substantially negligible.

The crystals may also be held in the solid state in accordance with this invention by removing the water liberated in the reaction from the crystals as soon as it is formed, for example, by suction. Some aluminum sulfate, however, may be present in solution along with ammonium sulfate in the water removed from the crystals.

It is particularly advantageous, in carrying out the present process, to remove the heat generated as well as water liberated in the reaction, since the crystals are thereby prevented from melting and/or going into solution and the ammonia gas is contacted with the solid crystals throughout the reaction.

In accordance with the present invention, the simultaneous removal of heat and water can be accomplished, for example, by vaporizing the water liberated in the reaction by means of non-reacting moisture-absorbing or drying gas, for example, by passing ammonia gas together with a moisture-absorbing or drying gas through a layer of crystals of an aluminum sulfate salt. The latent heat required for vaporization of the water acts effectively to remove heat generated in the reaction, and by regulating the proportion of the mixture of ammonia and moisture-absorbing gas and the velocity of its passage through the layer of crystals, effective temperature control can be maintained.

An excess of ammonia gas may be used as the moisture-absorbing gas, or dry air, or other dry inert gas such as hydrogen, nitrogen, or the like, may be mixed with the ammonia gas to vaporize the water.

For example, the operation may be carried out in the following way and the apparatus illustrated in the accompanying drawings has been found suitable.

As shown in the drawings, the apparatus comprises a series of traveling belts, each made of a porous material, for example, filter cloth, traveling over suction boxes. The letter "A" designates a chamber for the removal of ammonia tail gas from the mixture of ammonia gas and air, B, the main ammonia gas reactor, C, the device for removal of excess ammonia absorbed in the finished material, and D, traveling washing filters. The washing filters may be used independently for washing the alum crystals, as previously described, and also in the combination shown, for removing ammonium sulfate from the aluminum hydroxide. A, B and C are enclosed in air-tight fittings, whereas D may be open.

The fine alum crystals enter chamber A, through hopper 10, provided with an air-locked feeding gate 11, and are distributed on a traveling belt 12 by a leveller 13. Belt 12 travels in the direction indicated by the arrow. The crystals travel on the belt, supported by rollers 14, over a suction box 15. Moist air containing ammonia tail gas from chamber B as hereinafter described, enters chamber A through inlets 16 and 16a, is drawn through the moving layer of crystals on the belt and the belt itself into the suction box 15 and is removed from the box through a suction pipe 17. The crystals react with ammonia gas and are partly converted into the hydroxide, water formed in the reaction being largely drawn off through belt 12 into the suction box 15. The partly converted crystals are discharged into hopper 18, provided with an air locked discharging valve 19. The belt is kept clean by the rotating brush 20.

From the hopper, the crystals drop on to the first of a series of belts in chamber B, lettered 21a, 21b and 21c, each of which passes over a suction box 22, similar to suction box 15, previously described. The crystals, during the conversion process, pass successively from one belt to the next. The mixture of ammonia gas and moisture-absorbing gas, preferably dry air, used in the reaction enters chamber B through inlets 23, and is drawn through the layers of crystals on the belts into the suction boxes, whence the mixture, which still contains some ammonia, is removed through suction pipes 24, by the aid of a blower (not shown) and conveyed to chamber A through inlets 16 and 16a as previously described.

A rapid and even conversion of the crystals into hydroxide may be obtained by keeping the layer of crystals on the traveling belts fairly thin; a one-half to three-quarters inch layer has proved satisfactory. To aid in accomplishing this, a levelling distributor 25 is provided on the belts. The crystal size should not be too large. Crystals passing a twenty mesh screen are rapidly converted.

The proportions of the mixture of ammonia gas and air and the speed of the passage of the gas mixture through the layer of crystals should be adjusted in such a way that the material undergoing conversion does not become warm. It is preferably kept below ordinary room temperature. This may be readily accomplished, for example, in whole or in part by controlling the proportions of dry air in accordance with the temperature in B to secure the desired action by evaporation of water in the reaction, cooling being effected by loss of latent heat of vaporization. The speed of the traveling belts should be adjusted in such a way that the material is just completely converted at the moment of discharge.

The finished material, consisting of a mixture of aluminum hydroxide and ammonium sulfate may pass from the lowest belt 21c through an air locked discharge hopper 26 into and through excess ammonia removal chamber C and through its air locked discharge hopper 32 on to the traveling washing belts of apparatus D, already described, where ammonium sulfate is removed by washing and the washed aluminum hydroxide is dried. The sulfate solution is removed from the suction box 7 through suction pipe 9 and may be regenerated into solid form, for instance by evaporation and may be reused in the furnace operation for the production of anhydrous alum. The moist aluminum hydroxide freed from ammonium sulfate is discharged from the lowest belt 5c on to the conveyor belt 34 and disposed of according to the product to be manufactured therefrom.

Ammonia absorbed in the converted material discharged from chamber B may be removed in chamber C, before the hydroxide is filtered and washed. Chamber C is similar in construction to A and, as shown in Fig. 2, 27 is a traveling filter belt, 28 a suction box, 29 a suction pipe and 30 air inlets. The converted hydroxide travels on the belt over the suction box and ammonia absorbed in the material is drawn from it by the aid of air introduced through the inlet 30. The air with ammonia carried by it, passes through the belt and is removed from the suction box through the pipe 29.

The granular aluminum hydroxide is discharged from the belt 27 in chamber C through hopper 31 and airlocked valve 32 on to the first belt 5a of washer D, and passes over belts 5a, 5b and 5c. On belt 5a and 5b it is washed by sprays of water from spray pipes 8a and 8b, excess water is removed and the granules dried in passing over belt 5c. The granular product is then discharged, for example, on to conveyor 34.

Instead of depending primarily upon the cooling effect of evaporation by a dry inert gas, such as air, nitrogen, hydrogen, excess ammonia or the like, the cooling required for preventing the crystals from dissolving or melting may be secured by removing the heat generated in the reaction by vaporizing and expanding a volatile liquid within the reaction chamber. Liquid ammonia is particularly suitable, since it is readily available in compressed, liquefied state, it vaporizes and expands readily, and the gas is used in the conversion of the sulphate crystals into the hydroxide.

In operating in this manner, the liquefied ammonia containers, with their usual valve-controls, are directly connected to the inlets 23 of the reactor chamber B. The liquid ammonia enters the chamber, being sprayed upon the crystals, and vaporizes and expands, forming ammonia gas, used in the conversion reaction and bringing the reacting crystals to a low temperature. The heat generated in the reaction is consumed in vaporizing and expanding the liquid ammonia. Water liberated in the conversion reaction dissolves the ammonium sulfate formed as a concentrated ammonium sulfate solution, which is drawn into the suction boxes and removed with any excess ammonia through the suction pipes.

The conversion of the alum crystals into aluminum hydroxide takes place more rapidly when operating in this manner, due to the greater concentration of the ammonia gas and also to the more rapid permeation of crystals by the cooler gas than by warmer gas. For these reasons, coarser crystals can be utilized in this method than in the method described in Example 1. The reaction temperature is kept low, below 30° C., and preferably near 0° C. and the formation of pseudo crystals is complete, solution of alum by the water being effectively prevented.

Instead of using ammonia alone, or a mixture of ammonia and an inert gas, as previously described, I may use an aqueous ammoniacal solution saturated with ammonia gas at low temperatures, for instance, an ammonium sulphate solution. For this purpose, spray pipe 33 may be provided above the upper belt 21a in the reactor B.

The aluminum sulphate crystals enter the reactor through the air locked feed hopper 18 and pass successively over belts 21a, 21b and 21c, and the aluminum hydroxide is discharged from the lower belt through a hopper 26, as previously described.

The ammonium sulphate solution cooled to a low temperature, say below 30° C. and preferably 0° C., and saturated with ammonia, is introduced into the chamber through spray pipes 33 while cold. The temperature in the chamber is kept low, suitably below 30° C. and preferably near 0° C., for example, by regulating the volume of solution added and its temperature. Some ammonia gas evaporates from the solution and thereby aids in maintaining a low temperature, the proportion of ammonia gas evaporated regulating and controlling the temperature secured. The ammonium sulfate solution and ammonia gas are drawn through the crystal layer on the belts, the ammonia reacts with the crystals, and, owing to the formation of ammonium sulfate, the solution is concentrated in ammonium sulfate. The countercurrent principle may be applied in the operation.

The concentrated ammonium sulfate solution is transferred to a refrigerating unit (not shown), for instance, a heat exchanger, where at a preferred temperature of below 30° C. and preferably about 0° C., or lower, it is saturated with ammonia gas. During the saturation the ammonium sulfate dissolved in the conversion of the alum is crystallized out. The ammonia is supplied in proportion to secure the desired removal of ammonium sulfate, although, of course, additional ammmonia may be dissolved if desired. Thus, at 0° C., addition of ammonia to a concentration of 27-30% will crystallize out about 80% of the ammonium sulfate content of the solution, and more may be added if desired. The crystals are preferably filtered off and the solution returned to the reaction chamber.

The aluminum hydroxide discharged from the apparatus may be washed as previously described and the wash liquor crystallized for the regeneration of solid ammonium sulfate.

An advantage of preparing alumina in granular form in addition to facilitating filtering and washing the product is that the loss of alumina by dusting when treated in an electric furnace is very slight. Although alumina produced in this manner is more coarse than the product of the Bayer process or regular acid process, it is quite soluble due to its porosity.

It is readily apparent that this crystalline salt of aluminum may be employed in place of the aluminum sulfate compound above referred to, and that corresponding compounds of chromium, iron and the other metals forming insoluble hydrates on treatment with ammonia in the presence of water may be similarly converted into granular hydrates.

The principles of these methods are applicable to the conversion of crystals of other salts containing water of crystallization to pseudomorphs of an insoluble reactive product and any water-soluble reactive gas can be used in the same manner as the ammonia gas, for instance, by treating copper sulfate crystals with hydrogen sulfide gas the crystals are converted into pseudomorphs of the copper sulfate, consisting of copper sulfide. Crystallized hydroxides can, in the same way, be converted into carbonates by treatment with carbon dioxide; for instance, crystallized barium hydroxide can be converted into barium carbonate by treatment with carbon dioxide gas.

I claim:

1. The method of forming porous, coarse granular hydroxides of alum-forming metals which comprises reacting upon an alum in crystal form with ammonia and at the same time removing water liberated in the reaction and cooling the reaction mixture to maintain unreacted alum in crystal form.

2. The method of producing porous, coarse granular aluminum hydroxide from a crystalline aluminum salt containing water of crystallization which comprises subjecting crystals of said salt to the action of ammonia, simultaneously removing water liberated in the reaction, and simultaneously cooling the reaction mixture to a temperature such that unreacted salt is maintained in crystal form.

3. The method of producing porous, coarse granular aluminum hydroxide from an aluminum sulfate salt containing water of crystallization which comprises subjecting crystals of said salt to the action of ammonia and simultaneously vaporizing water liberated in the reaction, thereby simultaneously cooling the reaction mixture and preventing solution of the salt and maintaining unreacted salt in crystal form.

4. The method of producing granular aluminum hydroxide from and in the form of a pseudomorph of an aluminum sulfate salt containing water of crystallization, which comprises reacting with ammonia gas upon crystal of such salt, cooling the reaction mixture to keep the temperature thereof at substantially 0° C. during the reaction, thereby maintaining unreacted salt in crystal form and removing water liberated in the reaction.

5. The herein-described method of producing porous, coarse granular aluminum hydroxide from a crystalline aluminum sulfate salt containing water of crystallization which comprises vaporizing and expanding liquefied ammonia in contact with said salt, thereby supplying ammonia for reaction therewith and cooling the reacting salt, and drawing off water liberated in the reaction.

6. The method of producing granular aluminum hydroxide in the form of pseudomorphs of crystals of an aluminum sulfate salt containing water of crystallization which comprises subjecting crystals of such salt to the action of ammonia gas while expanding an inert liquefied volatile fluid in the presence of the reaction mixture, thereby cooling the latter to a temperature such as to maintain unreacted salt in crystal form.

7. The method of producing porous, coarse granular aluminum hydroxide from an aluminum sulfate salt containing water of crystallization which comprises subjecting crystals of said salt to the action of ammonia gas and simultaneously removing the heat and water liberated in the reaction by means of an inert moisture absorbing gas thereby retaining the crystalline form of the salt during the conversion.

8. The method of producing granular aluminum hydroxide from and in the form of a pseudomorph of an aluminum sulfate salt containing water of crystallization which comprises contacting crystals of said salt with a current of a mixture of ammonia gas and dry air, whereby reaction is effected and simultaneously liberated water is removed and cooling of the reaction mixture is effected.

9. The method of producing porous, coarse granular aluminum hydroxide from an aluminum sulfate salt containing water of crystallization, which comprises bringing crystals of said salt into contact with a mixture of ammonia gas and a moisture absorbing gas while keeping the temperature of said salt below 30° C.

10. The method of making porous, coarse granular aluminum hydroxide from and in the form of a pseudomorph of an aluminum sulfate salt containing water of crystallization which comprises subjecting crystals of said salt to the action of an ammonium sulfate solution saturated with ammonia gas at a temperature in the neighborhood of 0° C., vaporizing ammonia from said solution and simultaneously removing ammonium sulfate solution and ammonia gas liberated in the operation.

11. In the method of making porous, coarse granular aluminum hydroxide by reaction of ammonia in ammonium sulfate solution on aluminum sulfate containing water of crystallization, the steps which comprise saturating a concentrated ammonium sulfate solution with ammonia at a temperature in the neighborhood of 0° C., thereby crystallizing out part of the ammonium sulfate, removing the crystallized ammonium sulfate and contacting the mother liquor saturated with ammonia with the aluminum sulfate salt thereby precipitating aluminum hydroxide restoring ammonium sulfate to the solution, and removing concentrated ammonium sulphate solution from the zone of reaction.

12. The method of making porous, coarse granular aluminum hydroxide from an aluminum sulfate salt containing water of crystallization, which comprises subjecting crystals of said salt to the action of an ammonium sulfate solution saturated with ammonia gas at a temperature of 0° C. or lower, supplying said ammoniacal solution in a quantity sufficient to maintain said low temperature in the reaction mass during the reaction, removing liberated ammonia and ammonium sulfate solution by suction, saturating said ammonium sulfate solution with ammonia gas while maintaining a reduced temperature, separating ammonium sulfate crystals formed from the liquor, and returning the saturated ammoniacal liquor to react with aluminum sulfate salt crystals.

13. The method of forming porous, coarse granular aluminum hydroxide from an aluminum sulfate salt containing water of crystallization which comprises distributing crystals of said salt in a thin layer over a pervious support, contacting said crystals with ammonia gas, and simultaneously withdrawing water formed in the reaction through said pervious support and cooling the reaction mixture.

14. The method of forming porous, coarse granular aluminum hydroxide from an aluminum salt containing water of crystallization which comprises distributing crystals of said salt in a thin layer upon a pervious support, supplying ammonia gas for reaction with the aluminum salt, together with a moisture absorbing gas, above the layer of crystals, and simultaneously applying suction below said pervious support, whereby the ammonia gas and moisture absorbing gas are drawn through the body of crystals, the ammonia reacting with the crystals and the moisture absorbing gas cooling the reaction mass by water-evaporation, and at the same time water liberated in the reaction is removed from the reaction zone.

15. The method of making porous, coarse granular aluminum hydroxide from and in the form of a pseudomorph of an aluminum sulfate salt containing water of crystallization which comprises subjecting crystals of said salt to the action of an aqueous ammoniacal solution saturated with ammonia gas, while vaporizing ammonia from said solution and simultaneously removing from the zone of reaction, gas and the aqueous ammoniacal solution and water liberated in the reaction and while retaining the reaction mixture below 30° C.

SVEND S. SVENDSEN.

CERTIFICATE OF CORRECTION.

Patent No. 2,036,508.                                                          April 7, 1936.

SVEND S. SVENDSEN.

It is hereby certified that error appears in the printed specification of the above numbered patent requiring correction as follows: Page 3, first column, line 46, after the word "water" insert formed; page 4, first column, line 75, claim 2, after the word "aluminum" insert sulphate; and second column, line 20, claim 4, for "crystal" read crystals; and that the said Letters Patent should be read with these corrections therein that the same may conform to the record of the case in the Patent Office.

Signed and sealed this 19th day of May, A. D. 1936.

Leslie Frazer (Seal)                                                        Acting Commissioner of Patents.